United States Patent [19]
Konishi et al.

[11] 3,849,093
[45] Nov. 19, 1974

[54] AIR CLEANER FOR AUTOMOBILES
[75] Inventors: Masami Konishi, Toyota; Kenji Hikita, Toyihashi, both of Japan
[73] Assignees: Nippondenso Co., Ltd., Kariya-shi, Aichi-ken; Toyota Jidosha Kogyo Kabushiki Kaisha, Toyota-shi, Japan
[22] Filed: Sept. 15, 1972
[21] Appl. No.: 289,611

[30] Foreign Application Priority Data
Oct. 14, 1971  Japan.............................. 46-94866

[52] U.S. Cl...................... 55/316, 55/385, 55/510, 55/DIG. 28
[51] Int. Cl............................................. B01d 50/00
[58] Field of Search ...... 55/316, 510, DIG. 28, 385, 55/482

[56] References Cited
UNITED STATES PATENTS
2,868,322  1/1959  Stauffer..................... 55/DIG. 28 X
3,572,014  3/1971  Hansen............................. 55/510 X
3,678,663  7/1972  Hansen..................... 55/DIG. 28 X
3,710,560  1/1973  Maddocks........................ 55/510 X Primary Examiner—Frank W. Lutter
Assistant Examiner—William Cuchlinski, Jr.
Attorney, Agent, or Firm—Cushman, Darby & Cushman

[57] ABSTRACT

An air cleaner for automobiles having an air cleaning filter element within an air cleaner casing is provided with a fuel receiving plate therein for catching fuel leaking out of the float chamber of the carburetor connected with the cleaner in such occasions that the automobile turns sideways. The fuel receiving plate is provided along the inner periphery of an air outlet of the air cleaner.

5 Claims, 2 Drawing Figures

3,849,093

AIR CLEANER FOR AUTOMOBILES

BACKGROUND OF THE INVENTION

This invention relates to an air cleaner for automobiles, and more specifically to an air cleaner which catches gasoline leaking out of a carburetor when the automobile turns sideways at the time of collision or the like.

In the conventional air cleaner for automobiles, the fuel leaking out of the float chamber of the carburetor when the automobile turns sideways at the time of collision or the like is absorbed by a filter material within the air cleaner, but the fuel which has not been absorbed thereby leaks out of the air cleaner. Therefore, a fire is liable to be brought about thereby. This has been a great disadvantage of the conventional air cleaner from the viewpoint of safety of the automobiles.

SUMMARY OF THE INVENTION

The primary object of the present invention is to provide an air cleaner for automobiles which catches fuel leaking out of a carburetor when the automobile turns sideways for effectively preventing a fire.

In order to accomplish the above object of the invention and improve the safety of the automobile, in accordance with the present invention there is provided an air cleaner for automobiles in which a fuel catching plate is disposed at the inner periphery of an air cleaning filter element for catching the fuel leaking out of the carburetor, when the automobile turns sideways, thereby effectively catching the fuel leaking out of the air outlet thereof.

DESCRIPTION OF THE PREFERRED EMBODIMENT

Figure 1:
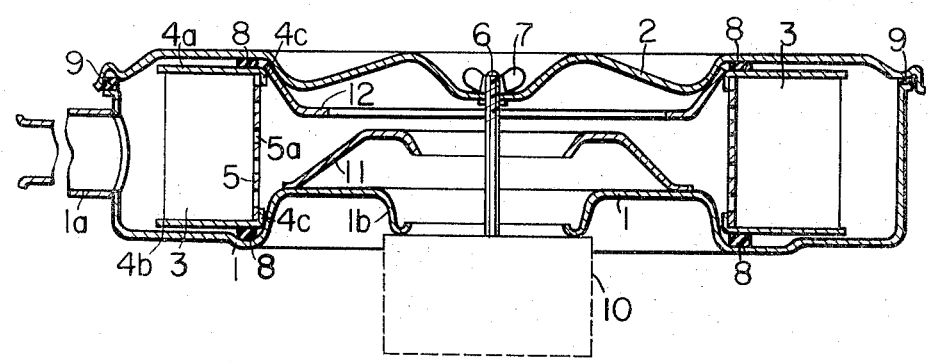
FIG. 1 is a partial vertical sectional view showing an embodiment of the air cleaner for automobiles in accordance with the present invention.
Figure 2:
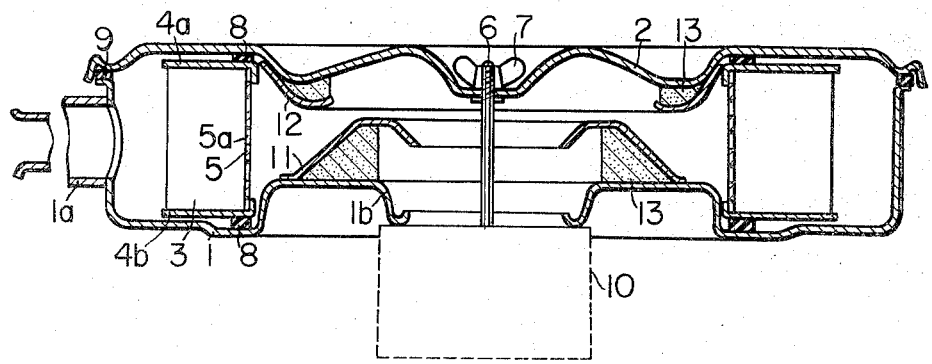
FIG. 2 is a partial vertical sectional view showing another embodiment of the air cleaner for automobiles in accordance with the present invention.

Now referring to FIG. 1 showing an embodiment of the invention, the reference numeral 1 indicates a lower casing of the air cleaner which is provided with an air inlet 1a at the side face portion thereof and with an air outlet 1b at the lower portion thereof. The reference numeral 2 indicates an upper casing of the air cleaner covering said lower casing 1, 3 indicates an air filter element for cleaning air disposed in said lower casing 1, and the filter element 3 is fixed between an upper end plate 4a and a lower end plate 4b by use of adhesive material to form a filter therebetween. The reference numeral 5 indicates a protective plate having a plurality of holes 5a for preventing distortion of said air cleaning filter element 3. The protective plate 5 is located between said filter element 3 and bent portions 4c, 4c of said upper end plate 4a and lower end plate 4b. The reference numeral 6 indicates a bolt for fixing the air cleaner lower casing 1 and the upper casing 2 to the carburetor, which is provided with a butterfly nut 7 screwed thereto from outside of the upper casing 2 for securing the casings. The reference numeral 8 indicates annular packings for preventing uncleaned air which has not passed through the air cleaning filter element 3 from flowing toward the air outlet 1b, which are provided between the air cleaner lower casing 1 and the lower end plate 4b, and between the upper casing 2 and the upper end plate 4a. The reference numeral 9 indicates an annular packing for preventing the lower casing 1 from directly contacting the upper casing 2 and making a noise or, what is worse, breaking, which is provided between the upper casing 2 and the lower casing 1 at the annular contact area thereof. The reference numeral 10 indicates a carburetor having a float chamber in which fuel is stored. The carburetor 10 is connected with the air outlet 1b. The reference numeral 11 indicates an annular lower fuel receiving plate provided along the inner periphery of the air cleaner filter element 3 and along the outer periphery of the air inlet 1b of the lower casing 1, and for instance, spot welded to the lower casing 1 and sealed with adhesive or the like at the welded portion for enhancing air-tightness. The annular lower fuel receiving plate 11 serves to store fuel from the float chamber of the carburetor 10 when the automobile turns sideways. The reference numeral 12 indicates an annular upper fuel receiving plate provided along the inner periphery of the filter element 3 and mounted to the air cleaner upper casing 2, and spot welded to the upper casing 2 and sealed with adhesive or the like at the welded portion to enhance the air-tightness. The annular upper fuel receiving plate 12 also serves to store fuel from the float chamber of the carburetor 10 when the automobile turns sideways.

In operation of the device in accordance with the present invention as described hereinabove, the air introduced through the air inlet 1a passes through the air cleaning filter element 3 and the cleaned air is sent to the carburetor 10 through the air outlet 1b in a case of normal driving condition. When the automobile turns sideways at the time of collision or the like, fuel within the carburetor 10 flows into the air cleaner by way of the air outlet 1b. This flowing back fuel, however, is caught in the spaces between the upper fuel receiving plate 12 and the upper casing 2, and between the lower fuel receiving plate 11 and the lower casing 1. Further, since the excessive fuel which has not been caught by the lower fuel receiving plate 11 and the upper fuel receiving plate 12 is absorbed by the air cleaning filter element 3, the fuel can be prevented from leaking out of the air cleaner.

Further, as a result of an experiment, when 60 g of the fuel leaked out of the float chamber of the carburetor 10 as an automobile turned sideways, 54 g of the fuel was caught by the upper and lower fuel receiving plates 12 and 11 and the residual 6 g of the fuel was absorbed by the air cleaning filter element 3. Further, ventilation resistance of the air cleaner was increased only by about 10 mm Aq by the presence of the lower and upper fuel receiving plates 11 and 12, which was proved not to deteriorate the performance of the air cleaner.

Although in the above embodiment of the present invention the fuel leaking out of the carburetor 10 is caught by the upper fuel receiving plate 12 and the lower fuel receiving plate 11 and the excessive fuel which is not caught by the upper and lower fuel receiving plates 12 and 11 is absorbed by the air cleaning filter element 3, it will be understood that the upper fuel receiving plate 12 may be eliminated and the fuel may be caught only by the lower fuel receiving plate 11 with the excessive fuel being absorbed only by the air cleaning filter element 3 in this invention.

In addition, although in the above embodiment of the present invention the fuel is caught in the spaces formed between the upper fuel receiving plate 12 and the upper casing 2 and between the lower fuel receiving plate 11 and the lower casing 1, it should be noted that a gasoline absorbing material 13 such as felt, unwoven cloth, active carbon, ceramics and the like may be disposed between the upper fuel receiving plate 12 and the upper casing 2 and between the lower fuel receiving plate 11 and the lower casing 1 to absorb the fuel from the float chamber of the carburetor 10 and the excessive fuel which is not absorbed by the gasoline absorbing material 13 may be absorbed by the air cleaning filter element 3. Thus, the leaking fuel can be more effectively absorbed. Further, the gasoline absorbing material 13 may be inserted either of the upper and lower fuel receiving plates 12 and 11.

In the present invention as described hereinabove, there is a valuable effect or advantage that the fuel leaking out of the float chamber of the carburetor when the automobile turns sideways at the time of collision or the like can be caught by said fuel receiving plates and the excessive fuel which is not caught by the fuel receiving plates can be absorbed effectively by said air cleaning filter element whereby the fuel is prevented from leaking out of the air cleaner and the fire of the automobile can be effectively prevented, since at least one fuel receiving plate is provided along the inner periphery of the air cleaning filter element for catching the fuel leaking out of an air outlet in an air cleaner for automobiles comprising an air cleaner case including an upper casing, a lower casing, an air inlet, and an air outlet, and an air cleaning filter element provided in said air cleaner case.

What is claimed is:

1. An automotive air cleaner, including:
    an annular air cleaning filter element;
    housing means enclosing the filter element and including means sealing with the axially opposite ends of the filter element;
    the housing means further including means defining an inlet thereto disposed radially outwardly of the filter element sealing means and means defining an outlet therefrom disposed generally centrally of the filter element and opening through the bottom of the housing radially inwardly of the sealing means, completing a passageway for air extending from said inlet, through the filter element and out the outlet;
    wall means defining, when secured in said housing, a liquid-tight annular receptacle within said housing having a mouth opening radially inwardly surrounding said outlet and being disposed radially inwardly from the filter element;
    means securing the receptacle wall means with respect to the housing for preventing said passageway from extending under the receptacle, whereby said passageway extends over the outside of the receptacle and down past the mouth thereof to reach said outlet, the receptacle being thereby positioned to trap liquid fuel escaping into the air cleaner through said outlet if and when the automotive vehicle incorporating the air cleaner turns on its side.

2. The automotive air cleaner of claim 1 further including a body of absorbent material for liquid fuel, disposed in the annular receptacle.

3. The automotive air cleaner of claim 1 further including means defining a second liquid-tight annular receptacle within said housing having a mouth opening radially inwardly spaced above the first-mentioned receptacle and disposed radially inwardly from the filter element; means securing the second receptacle with respect to the housing for preventing said passageway from extending over the second receptacle, whereby said passageway extends under the outside of the second receptacle and between the first-mentioned and second receptacles, the second receptacle being thereby positioned to trap liquid fuel escaping into the air cleaner through said outlet as a supplement to the first-mentioned receptacle.

4. The automotive air cleaner of claim 3 further including a body of absorbent material for liquid fuel, disposed in the second receptacle.

5. The automotive air cleaner of claim 1 wherein the lower extent of the receptacle is defined by the interior of the housing itself and wherein the remainder of the receptacle is defined by an annular plate having a lower, radially outer edge region in contact with the interior of the housing and an upper, radially inner edge region curving downward toward the air outlet.

* * * * *